Sept. 4, 1962   M. L. MILLER ET AL   3,052,117
MOTOR TESTING APPARATUS
Filed Dec. 11, 1956   2 Sheets-Sheet 2

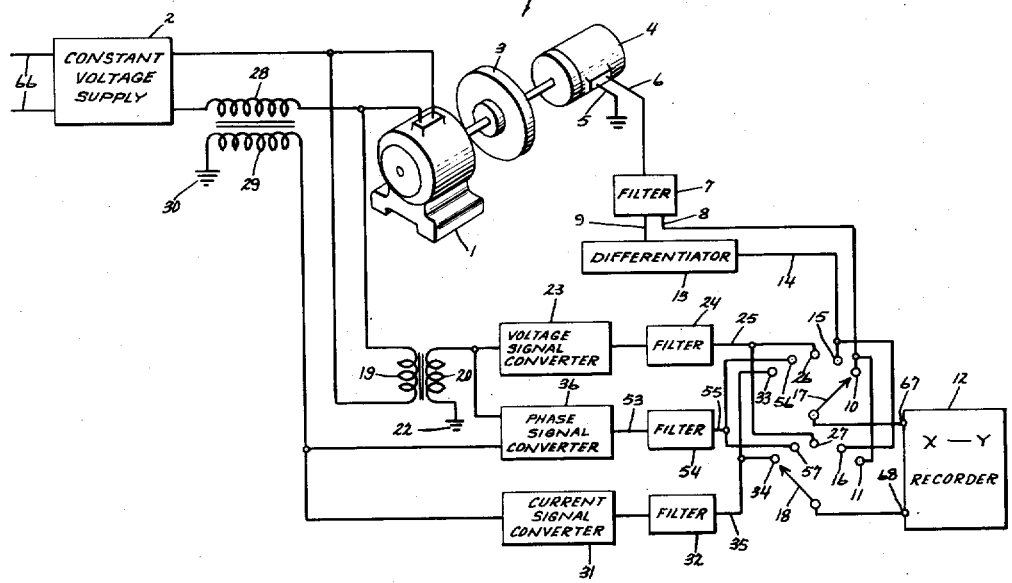

Inventors:
Meritt L. Miller,
Floyd H. Wright,
by Robert G. Irish
Their Attorney.

United States Patent Office 3,052,117
Patented Sept. 4, 1962

3,052,117
MOTOR TESTING APPARATUS
Meritt L. Miller and Floyd H. Wright, Fort Wayne, Ind., assignors to General Electric Company, a corporation of New York
Filed Dec. 11, 1956, Ser. No. 627,711
6 Claims. (Cl. 73—116)

This invention relates to testing apparatus, and more particularly to the type of equipment used for determining various characteristics of electric motors during starting and running.

In the past, the testing of electric motors to determine various characteristics of the motors during starting and running has been a relatively tedious task. In order to provide curves showing the motor characteristics, it has been necessary to meter various electrical and mechanical characteristics, to take readings of the characteristics at different given instants during motor operation, plot curves through the points so obtained. Such an approach obviously does not lend itself to rapid testing of motors, and in effect precludes any substantial production testing where both accuracy and speed are essential. Since production testing is most important if the quality of the motors is to be maintained at the desired level, it is desirable to provide motor testing equipment which will accurately provide all the wanted information substantially instantaneously at the time the motor is run. Where two or more motor characteristics are being measured against each other, as is usually the case, it is, further, important that the signals provided by the test equipment to the information-transmitting apparatus represent characteristics at the same instant since, otherwise, the curve of the characteristics will actually misrepresent their true relationship.

It is, therefore, an object of this invention to provide motor testing equipment which will indicate the selected characteristics of a motor with speed, accuracy, and completeness.

It is a further object of the invention to provide apparatus which transmits the signals representing the motor characteristics so that signals transmitted simultaneously represent characteristics at the same instant of operation.

In one aspect thereof, the invention provides motor testing equipment which includes a constant voltage supply source adapted to be connected across the motor to be tested. The motor is connected to two different rapid-response means, each of which senses a different characteristic of the motor during starting and running thereof and converts the characteristic into an electrical signal. A pair of filters are respectively arranged in series with the means for substantially smoothing out the signals. The filters each have a predetermined relatively short time delay which compensates for differences in the time delays of the means, thus causing the signals from the filters to represent characteristics of the motor at approximately the same given instant.

This relationship of the filters with respect to the means is most important because without it the two means will, as a result of any differences in their construction, provide signals from different instants in the operation of the motor. Plotting these signals against each other will therefore provide a misrepresentation of the true performance of the motor inasmuch as each point on the curve will represent one characteristic at one instant of time and another characteristic at another instant of time.

The features of the invention which are believed to be novel are set forth with particularity in the appended claims. The invention itself, however, both as to its organization and method of operation together with further objects and advantages thereof, may best be understood by reference to the following description taken in connection with the accompanying drawings.

In the drawings, FIGURE 1 is a schematic diagram of a first embodiment of the improved test equipment of this invention;

FIGURE 2 is a schematic diagram of one possible construction of the phase signal converter of FIGURE 1;

FIGURE 3 is a graph showing the output signal from the phase signal converter of FIGURE 2;

Figure 5:
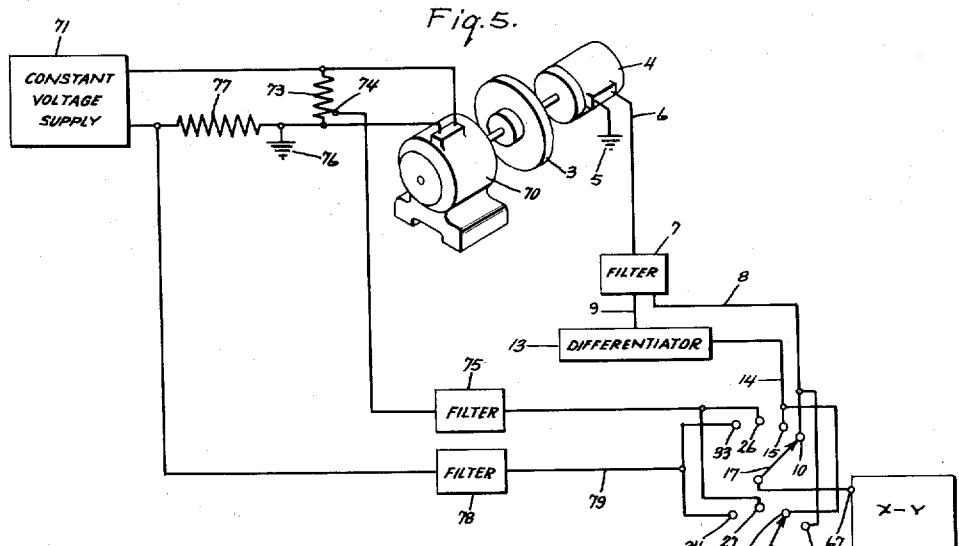
FIGURE 5 is a schematic diagram of a second embodiment of the improved test equipment of the invention.

Referring now to FIGURES 1 to 4 of the drawings, there is shown an electric motor 1 connected across an alternating current constant voltage supply 2, such as, for instance, a constant voltage transformer as shown in Patent 2,143,745, provided with proper correction to ensure a substantially pure sine wave output, which in turn is connected across alternating current supply line 66. Motor 1 is connected in direct driving relation with a flywheel 3 and a direct current tachometer generator 4 having a pair of output lines 5 and 6, with line 5 being grounded as shown. The load, or flywheel, 3 serves the important function of determining the amount of time which will be required by the motor from the time it is started until it reaches full speed, and has thus gone through its starting characteristics. Where motor 1 is a relatively small split phase fractional horsepower motor, for instance, it has been found that the time for the motor to come up to speed is preferably between two and four seconds. When the motor comes up to speed in less than two seconds, there is likely to be insufficient time for the equipment (to be described herebelow) to provide accurate and simultaneous measurements of the various motor characteristics. Above 4 seconds, there is a tendency for the motor to have become overheated to some extent; this changes the characteristics considerably so that they may no longer represent a true representation of the motor performance. Other types of motors will, of course, have differing optimum time ranges.

The proper inertia of the load (where a substantially pure inertia is used) may, if desired, conveniently be computed by the formula $$I = \frac{TX}{2\pi S}$$

where I represents the inertia load in ounce-feet-seconds$^2$, T is the estimated average motor torque in ounce-feet, X is the desired test period in seconds, and S is the synchronous speed of the motor in revolutions per second. In this equation, I represents the combined inertia of flywheel 3 and the rotating members of motor 1 and tachometer generator 4.

When both speed and torque are to be measured from the output of tachometer generator 4, as will be explained below, it is important that the load on motor 1 be substantially purely inertia. This results from the fact that, where both torque and speed are taken from the tachometer generator output, the torque is being computed as linearly proportional to the acceleration, and this relationship is present only in the case of a pure inertia load.

Line 6 carries a direct current signal from tachometer generator 4 to a rapid-response filter 7 which in turn has a pair of output lines 8 and 9. Line 8 is connected directly to switch contacts 10 and 11 which in turn may be connected through contact arms 17 and 18 respectively to the terminals 67 and 68 of suitable information-transmitting apparatus such as recorder 12; line 9 is connected through a differentiator 13 and a line 14 to a pair of switch contacts 15 and 16 also connectable through arms 17 and 18 to the recorder.

Tachometer generator 4 is selected to have a direct current output signal linearly proportional to its rotational speed and with as little ripple and dissymmetry as possible. Such tachometer generators are readily commercially available, and therefore a complete description is omitted as unnecessary in the illustration of the invention. However, filter 7 cannot be dispensed with because a certain amount of ripple and dissymmetry is unavoidable, both from the motor being tested and from the tachometer generator, and must be filtered out to a major extent. While filter 7 may be any of several commercially available filters, and is therefore not shown in detail, it is preferably of the R-C, or resistance-capacity, type as opposed to the L-C, or inductance capacity, type so as to ensure accuracy in the filtering of low-frequency components of the signal. Reference to sections 4–8 of the book "Radiotron Designers Handbook" 4th edition, by F. Langford Smith will provide an illustration of a typical filter suitable for the purpose.

Since the tachometer generator 4 has a linear output, filter 7 receives a direct current signal which is proportional to the speed; a filtered signal directly proportional to motor speed is therefore received at contacts 10 and 11 through line 8. The signal which passes through line 9 is received by a differentiator 13 which is constructed to provide to line 14 an output signal representing the first derivative of speed with respect to time. Again, such differentiating equipment may be of a standard commerically available type and is therefore not described in detail; one possible construction is described, for instance, in sections 4–6 of the book "Ultra High Frequency Techniques" by J. G. Brainerd, et al., published by D. Van Nostrand Co. The first derivative of speed with respect to time provides a measure of the acceleration of motor 1 at any given instant. As explained before, in the case of a pure inertia load the acceleration is directly proportional to torque, and therefore the signal from differentiator 13 to contacts 15 and 16 represents the torque of motor 1 at any given instant.

With the construction thus far described, the speed of the motor with respect to the torque may be measured by connecting recorder contact arm 17 to contact 10, for instance, so as to measure speed on the X axis of the recorder and by connecting contact arm 18 to contact 16 to measure torque on the Y axis of the recorder. Differentiating equipment normally has practically no time delay; therefore, the fact that tachometer generator 4 provides both direct current signals insures that a plot of one characteristic against the other will be an accurate representation of the motor performance at any given instant.

A transformer primary winding 19 is connected across motor 1; the secondary winding 20 is grounded at one side, as shown at 22, and has its other side connected to a rapid-response voltage signal converter 23 having a direct current output signal. Converter 23 may be of a standard commercially available type and is therefore not shown in detail; the apparatus known as a full wave instrument rectifier used in rectifier type alternating current meters is one example of apparatus suitable for the purpose. A standard type or rapid-response filter device 24 (which may, for instance, be of the same general type as filter 7) is connected in series with converter 23 to eliminate most of the ripple which is present in the direct current signal from the converter. The filtered signal is then sent from filter 24 through line 25 to contacts 26 and 27.

A current transformer primary coil 28 is connected in series with motor 1. The secondary winding 29 of this transformer has one side 30 connected to ground and is connected at its other side to a rapid-response current signal converter 31 which can also be of a standard instrument type rectifier such as that given above in connection with converter 23, readily available through normal commerical channels. Converter 31 is connected to a rapid-response filter 32 (which may be of the same general type as the others) which eliminates the major part of the ripple of the direct current signal output from converter 31. The filtered signal is sent to a pair of contacts 33 and 34 through line 35 from filter 32.

A rapid-response phase signal converter 36 is connected both to one side of secondary winding 20 and to one side of secondary winding 29 so as to receive both the voltage and current signals. While phase signal converters of various types are readily available through commercial channels, a relatively detailed description of a preferred type is provided in FIGURE 2 since its use in testing apparatus is believed relatively new. Referring now particularly to FIGURE 2, the voltage, or "reference" signal from transformer secondary winding 20 is sent through filter 37 and amplifier 38 to primary winding 39 of transformer 40. The current, or measuring, signal is sent through filter 41 and amplifier 42 to a primary winding 43 of a transformer 44. Again, the filters may be of the same general type heretofore discussed.

Secondary winding 45 of transformer 40 has its ends connected across a synchronous switch 46 which controls a pair of contact arms 47 and 48 respectively engageable with contacts 49 and 50, and 51 and 52. Contacts 50 and 51 are connected to ground, as shown, and contacts 49 and 52 are connected to the output line 53 from converter 36. Filters 37 and 41, amplifiers 38 and 42, and the other elements of the phase signal converter are so selected that the reference and the measure have identical apparent phase delays within the converter so as to retain the original phase relationship between them.

Referring now to FIGURE 3, the output voltage curve and the reference voltage curve with respect to time are shown. It will be observed that the output of secondary winding 45 is an ordinary alternating current signal which passes through the zero voltage line every half cycle. Each time the reference passes through zero, switch 46 reverses arms 47 and 48. This, in effect, reverses the form of the measure voltage every half cycle to create a wave form substantially as shown; the ratio of the positive output voltage to the negative output voltage, i.e., that above the zero line divided by that below the zero line, is a function of the phase difference between the reference and the measure. As the phase difference increases from 0° to 90°, the output on line 53 approaches zero as a cosine function. Thus, the signal represents an accurate measure of the phase difference between the reference and the measure. In addition, the output through line 53 is directly proportional to the voltage across primary winding 43, which in turn is proportional to the current through the motor. By virtue of these relationships, the output through line 53 is proportional to motor current times the cosine of the phase angle. Since the voltage across motor 1 is constant, the output signal through line 53 is, then, also proportional to line voltage times motor current times the cosine of the phase angle; this, in turn, represents the power input in watts to the motor. Thus, it will be seen that the phase signal converter illustrated may provide either the phase angle, the wattage, or both.

While a mechanical synchronous switch 46 has been illustrated for purposes of explanation, it will be understood that electronic apparatus may be provided to perform the same function, and that such will frequently be the case since the time requirements are likely to make a mechanical switch unduly expensive. Also, the detailed description of phase signal converter 36 is intended only to illustrate one possible approach to the problem of converting the motor input power or the current phase angle to a direct current signal, and is not intended to exclude any other type of watts or phase angle converter.

Line 53 connects converter 36 to a rapid-response filter 54 which eliminates the major part of the ripple in the converter signal and passes the filtered signal through line 55 to switch contacts 56 and 57. Filter 54 may be of the standard type described above, if so desired.

It will now be observed that recorder 12 can show the relationship between any two of the five characteristics (two mechanical: speed and torque; three electrical: current, voltage, and watts or phase angle) of motor 1 which are measured by the apparatus. It will further be observed that complete information on each characteristic is available almost instantaneously after the actual occurrence of the phenomenon in the motor. It will, of course, be understood that while a standard type of recorder (which records two characteristics with respect to each other) has been shown, any suitable information-transmitting apparatus may be used to convey the importance of each signal to an observer. Thus, for instance, an oscillograph may be used; if this is done, it is conceivable that all five quantities may be observed at once on the same time axis. As another example, the signals and their relationship to each other may be translated for an observer into either "acceptable" or "rejected," thus eliminating all need for analysis of each set of curves.

Figure 4:
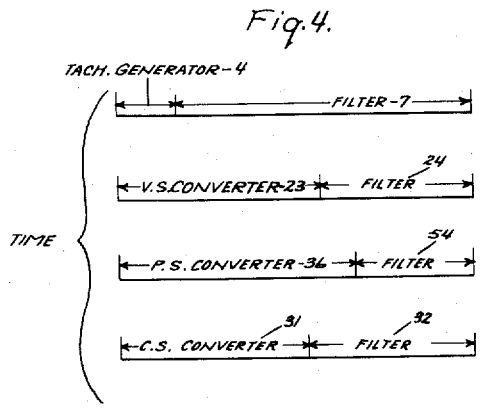
FIGURE 4 is a diagrammatic illustration of the compensating function of the filters of the apparatus as shown in FIGURE 1.

There is one important feature which must be included in the apparatus and which has not yet been discussed. The tachometer generator 4 and the converters 23, 31 and 36 each requires a finite time to transmute the characteristics received into direct current signals. An approximation of these times is represented by the horizontal distances as indicated in FIGURE 4. It will be seen that the different nature of each device causes it to take a different amount of time to convert the motor characteristic into the direct current signal. If, then, the filtering of each direct current signal is done without regard to the error thus introduced, the error will remain or be compounded; each direct current signal representing a motor characteristic which reaches recorder 12 will, under such circumstances, represent a characteristic of the motor at a different instant during its starting or operation. In a plot of any one characteristic relative to another, under such circumstances, each point will actually represent one characteristic at one instant in time and another characteristic at another instant. Thus, the conversion of the characteristics to direct current signals introduces a component of error which may render the equipment substantially useless for suitably accurate measurements.

Because of this, filters 7, 24, 32 and 54 have an important second function in addition to their normal one of substantially smoothing out the signal. In effect, the filters are so selected as to compensate for differences in the time delays of the different converting equipment. Each filter is so selected that its time delay, together with that of the equipment which provides the signal that it filters, comes out to approximately the same total time as that taken by each other group of a converter and a filter.

It is important to the effectiveness of the testing apparatus that the time delay of all the components, both the filters and the converting apparatus, be relatively short. A short response permits selection of readily available components which will compensate relatively accurately. When a long time delay is present in the components of the system, it has been found that correction and compensation of the time delays to make the signals arrive simultaneously at the recording apparatus becomes so difficult as to be almost impossible in the light of today's technology. It has also been found important to use direct current signals because of the difficulties thus far encountered in properly filtering alternating current signals and, at the same time, achieving the desired compensating effect.

It will be observed from the foregoing explanation that the mechanical characteristics of speed and torque, and the electrical characteristics of amperes, volts and watts or phase angle of motor 1 during starting and operation can be rapidly and accurately ascertained for any given instant or over any given period. Since the motor output may be computed from the speed and torque, and since the input in watts is available from converter 36 or as the product of amperes, volts and phase angle, the efficiency of the motor may readily be ascertained by the proportion of the output to the input. Thus, in effect, all the characteristics of any importance whatsoever of motor 1 may be ascertained with the testing equipment described.

Referring now to FIGURE 5, there will be described a second embodiment of the invention using like numerals for parts which are the same as in the embodiment of FIGURE 1. In this case, a direct current motor 70 is to be tested rather than an alternating current motor 1 such as shown in FIGURE 1. Motor 70 is connected across a direct current constant voltage supply 71.

As before, the motor being tested is connected in direct driving relation with a flywheel 3, and a direct current tachometer generator 4 having a pair of output lines 5 and 6, with line 5 being grounded as shown. The same general requirements for the flywheel 3 are present as in the embodiment of FIGURE 1. Line 6, as before, connects the tachometer generator to a rapid response filter 7 which in turn has a pair of output lines 8 and 9. Line 8 is connected directly to switch contacts 10 and 11 and, as before, there are provided a pair of contact arms 17 and 18 which are respectively connected to the terminals 67 and 68 of recorder 12; switch arms 17 and 18 are respectively engageable with contacts 10 and 11. Line 9 is again connected to differentiator 13 which in turn is connected through line 14 to a pair of switch contacts 15 and 16 which are also connectable to recorder 12 through switch arms 17 and 18.

The requirements and limitations of tachometer generator 4, filter 7, and differentiator 13 are the same as have previously been described in connection with FIGURE 1. It will be observed that the construction thus far is substantially the same as that of FIGURE 1 and permits measurement of the speed and torque of motor 70 relative to each other.

A resistance 73 is connected across the direct current lines which supply energy to motor 70. A tap 74 is electrically connected to resistance 73 intermediate its ends, and is connected to a rapid response filter 75 which may, for instance, be of the same type as filter 7. The voltage signal supplied across filter 75 and ground, as shown at 76, is, of course, proportional to the direct current voltage across motor 70 in a proportion which is determined by the location of tap 74. Thus, filter 75 receives a direct current signal of suitable magnitude, smooths it out to the extent needed, and transmits it to contacts 26 and 27.

Another resistance 77 is provided in one of the lines supplying energy to motor 70, and a filter 78, which may be of the same general type as filter 75, is connected to the opposite side of resistance 77 from ground 76. There is thus provided across ground 76 and the line to filter 78 (which smooths it out to the extent needed) and contacts 33 and 34 a direct current voltage signal which is proportional to the current passing through resistance 77. It will now be observed that recorder 12 can show the relationship between any two of the four characteristics (two mechanical: speed and torque; two electrical: current and voltage) of motor 70 which are measured by the apparatus.

The filters 7, 75 and 78 in the apparatus of FIGURE 5 have the same important function which was described in connection with the apparatus of FIGURE 1. While simultaneous signals from filters 75 and 78 will represent characteristics of motor 70 at the same instant, this is not true of a simultaneous signal from filter 7. Thus, as before, filters 7, 75 and 78 of FIGURE 5 perform a compensating function so that simultaneous signals from the filters represent simultaneously occurring performance characteristics of motor 70. It will now be seen that the concept of the invention is also applicable to the testing of direct current motors.

Figure 6:
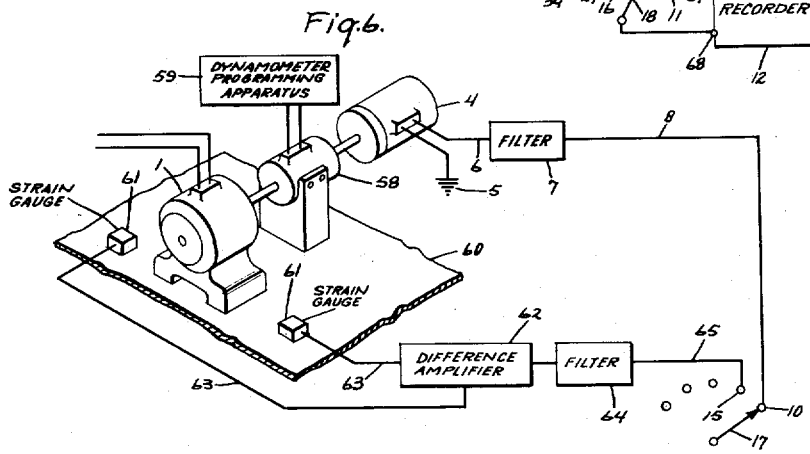
FIGURE 6 is a fragmentary schematic diagram of a modified circuit which may be substituted for part of the circuitry shown both in FIGURES 1 and 5.

Referring now to FIGURE 6, a modification of that part of the circuitry which pertains to the torque and speed measurements will be described using like numerals for like parts. As before, motor 1 is connected across the source of constant voltage power (not shown in FIGURE 6). While, as before, a flywheel or pure inertia type of load may be used, the requirement for pure inertia is no longer present, as will be explained below. Therefore, other types of loads such as, for instance, dynamometer 58 which is controlled by dynamometer programming apparatus 59, may be provided instead. Motor 1 is again in direct driving relation to tachometer generator 4 which is connected to filter 7 by conductor 6 and to ground by conductor 5. Dynamometer 58 and programming apparatus 59 are selected with the same basic purposes in mind as before, that is, to maintain the time for motor 1 to come up to speed from standstill in the optimum range. The filtered signal from tachometer generator 4 passes through line 8 to contact 10 as before.

Motor 1 is mounted on a reaction base 60 which includes a pair of strain gauges 61 which both send signals into difference amplifier 62 through lines 63. The strain gauges are arranged so that the difference of the signals which they emit represents the torque output of motor 1 at any given instant. This signal is then sent from amplifier 62 to rapid-response filter 64 (which may be of the same standard type as the other filters) and thence through line 65 to contact 15 of the recording apparatus. The remainder of the test equipment is unchanged and therefore is not shown. It will be observed that in the case of the embodiment of FIGURE 6, the signal representing the motor torque has been divorced from the signal representing the motor speed so that the two are produced and measured and modified independently of each other rather than as in FIGURE 1. This introduces an extra filter 64 into the system which must, of course, have the same total time delay, together with the difference amplifier 62 and the strain gauges 61, as all the remainder of the signal transmitting apparatus. The fact that the total torque is measured through strain gauges, rather than as a function of acceleration, eliminates the need for a pure inertia load such as was present in the embodiment of FIGURE 1, and permits the use of any desired type of load, such as the dynamometer 58. It is obvious, without providing an additional figure in the drawings, that the arrangement of FIGURE 6 is equally useful whether the motor being tested is of the alternating current or direct current type, and that, therefore, it may be used as an alternative for torque and speed measurements both with the type of apparatus shown in FIGURE 1 and with apparatus of the type shown in FIGURE 5.

It will be seen from the foregoing that the invention provides testing apparatus for electric motors which permits comparison of different characteristics of a motor very rapidly and very completely. In the embodiments illustrated, the voltage measured is that across the motor while the current measured is that through the motor. However, it will of course be understood that suitable switching apparatus may be added to the voltage signal apparatus and the current signal apparatus, so that in effect the voltage across any part of the motor and the current through any part of the motor may be measured. Thus, with suitable switching apparatus, other performance characteristics such as the voltage across a single winding of the motor might be measured rather than the voltage across the entire motor. These possibilities involve no invention over the apparatus as described in connection with the drawings and may be effected so simply as to require no additional illustration.

While this invention has been explained by describing particular embodiments, it will be apparent that improvements and modifications may be made without departing from the scope of the invention as defined in the appended claims.

What we claim as new and desire to secure by Letters Patent of the United States is:

1. Motor testing apparatus comprising a constant voltage alternating current supply source adapted to be connected across a motor to be tested, a substantially pure inertia load adapted to be driven by the motor, a direct current tachometer generator of the type having relatively little ripple or dissymmetry adapted to be connected to be driven by the motor, said tachometer generator having a direct current output signal of a magnitude linearly proportional to the speed of rotation thereof, a rapid response filter connected to receive the direct current signal from said tachometer generator, said filter being arranged to provide a pair of output signals, a differentiator connected to receive one of said output signals from said filter, said differentiator having an output signal representing the first derivative of the speed of the motor with respect to time, rapid response means for sensing at least one electrical characteristic of said motor during starting and running thereof and for converting said characteristic into a direct current signal, a rapid response filter in series with said means for substantially smoothing out said direct current signal, said direct current signals conducted to said two filters representing characteristics of said motor at different times, an information transmitting apparatus, circuit means connecting said two filters in circuit with said information transmitting apparatus to conduct said direct current signals to said transmitting apparatus, said two filters each having a predetermined time delay compensating for differences in the time delay of said tachometer generator and said means whereby simultaneous signals from said filters and from said differentiator represent instantaneous characteristics of said motor at approximately the same time and said information transmitting apparatus thereby providing substantially instantaneously as the motor is started and run comparative data of at least two characteristics of the motor.

2. Motor testing apparatus comprising a constant voltage alternating current supply source adapted to be connected across a motor to be tested, a load adapted to be connected to be driven by the motor for predetermining the amount of time taken by the motor to come up to speed, a tachometer generator of the type having little ripple or dissymmetry in the output signal adapted to be driven by the motor, said tachometer generator having a direct current output signal having a linear variation with respect to the speed of rotation thereof, rapid response means connected to the motor to sense the torque of said motor and to convert the torque into a direct current signal, means for sensing at least one electrical characteristic of the motor and for converting said electrical characteristic into a direct current signal, and three filters respectively in series with said tachometer generator and said two rapid response means for substantially smoothing out said direct current signals, said direct current signals appearing at said three filters being out of phase with respect to the instantaneous characteristics represented by said signals due to the time delay induced by said tachometer generator and said rapid response means, an information transmitting apparatus, circuit means connecting said filters in circuit with said transmitting apparatus to conduct said signals from said filters to said information transmitting apparatus, said filters each having a predetermined time delay compensating for differences in the time delays of said means whereby simultaneous signals from said filters represent characteristics of the motor at approximately the same given instant, said information transmitting apparatus thereby providing substantially instantaneously as the motor is started and run comparative data of at least two instantaneous characteristics of the motor.

3. Motor testing apparatus comprising a constant voltage alternating current supply source adapted to be connected across a motor to be tested, a substantially pure inertia load adapted to be connected to be driven by the motor for predetermining the amount of time taken for the motor to come up to speed, a tachometer generator of the type having a direct current output signal varying linearly with the speed of rotation with little ripple or dissymmetry adapted to be connected to be driven by said motor, a rapid response filter connected substantially to smooth out the signal from said tachometer, said filter providing a pair of direct current output signals, a differentiator connected to receive one of said signals from said filter, said differentiator having an output signal representing the first derivative of the speed of the motor with respect to time, rapid response voltage signal converter adapted to be connected to sense the voltage across the motor and to convert the voltage into a direct current signal, a rapid response current signal converter adapted to be connected to sense the current through the motor and to convert the current into a direct current signal, a rapid response phase signal converter adapted to be connected to sense the phase angle of the current through the motor and to convert the phase signal into a direct current signal, three rapid response filters respectively in series with said converters for substantially smoothing out the three direct current signals therefrom, said signals appearing at said filters being out of phase with respect to the instantaneous characteristics represented by said signals due to the time delay introduced by said converters, an information transmitting apparatus, circuit means connecting said filters in circuit with said transmitting apparatus to conduct said signals from said filters to said information transmitting apparatus, said four filters each having a predetermined time delay compensating for differences in the time delays of said converters and said tachometer generator whereby simultaneous signals from said filters and said differentiator represent five characteristics of the motor, said information transmitting apparatus thereby providing substantially instantaneously as the motor is started and operated comparative data of at least two instantaneous characteristics of the motor.

4. Motor testing apparatus comprising a constant voltage direct current supply source adapted to be connected across a motor to be tested, a substantially pure inertia load adapted to be driven by the motor, a direct current tachometer generator of the type having relatively little ripple or dissymmetry adapted to be connected to be driven by the motor, said tachometer generator having a direct current output signal of magnitude linearly proportional to speed of rotation thereof, a rapid response filter connected to receive the direct current signal from said tachometer generator, said filter being arranged to provide a pair of output signals, a differentiator connected to receive one of said output signals from said filter, said differentiator having an output signal representing the first derivative of the speed of the motor with respect to time, rapid response means for sensing the current through said motor during starting and running thereof and for converting said current into a direct current voltage signal, a rapid response filter in series with said means for substantially smoothing out said direct current signal, said rapid response means introducing a time delay in said signals so that the signals appearing at said filters represent instantaneous characteristics of said motor out of phase with each other, an information transmitting apparatus, circuit means connecting said filters in circuit with said information transmitting apparatus to conduct said signals from said filters to said information transmitting apparatus, said two filters each having a predetermined time delay compensating for differences in the time delay of said tachometer generator and said means whereby simultaneous signals from said filters and from said differentiator represent characteristics of said motor at approximately the same given instant, said information transmitting apparatus thereby providing substantially instantaneously as the motor is started and run comparative data of at least two characteristics of the motor.

5. Motor testing apparatus comprising a constant voltage supply source adapted to be connected across a motor to be tested, a substantially pure inertia load adapted to be driven by the motor, a direct current tachometer generator of the type having relatively little ripple or dissymmetry and driven by the motor, said tachometer generator having a direct current output signal of a magnitude linearly proportional to the speed of rotation thereof, a differentiator connected in circuit with said tachometer generator and providing an output signal representing the first derivative of the speed of the motor with respect to time, rapid response means for sensing at least one electrical characteristic of said motor during starting and running thereof and for converting said characteristic into a direct current signal, at least a pair of filters, an information transmitting apparatus, circuit means for connecting one of said filters in circuit with said information transmitting means and said tachometer generator and for connecting the other of said filters in circuit with said information transmitting means and said rapid response means, said direct current signals provided by said tachometer generator and said rapid response means representing characteristics of said motor at different times, said filters providing a predetermined time delay compensating for differences in the time delay of said tachometer generator and said rapid response means whereby the simultaneous signals supplied to said information transmitting means represent instantaneous characteristics of said motor at approximately the same time, and said information transmitting apparatus thereby providing substantially instantaneously as the motor is started and run comparative data of at least two characteristics of the motor.

6. Motor testing apparatus comprising a constant voltage source adapted to be connected across a motor to be tested, a substantially pure inertia load adapted to be connected to be driven by the motor for predetermining the amount of time taken for the motor to come up to speed, a tachometer generator of the type having a direct current output signal varying linearly with the speed of rotation with little ripple or dissymmetry adapted to be connected to be driven by said motor, a differentiator connected in circuit with said tachometer generator and providing an output signal representing the first derivative of the speed of the motor with respect to time, a rapid response voltage signal converter adapted to be connected to sense the voltage of the supply and to convert the voltage into a direct current signal, a rapid response current signal converter adapted to be connected to sense the current supplied to the motor and to convert the current into a direct current signal, at least a pair of rapid response filters, an information transmitting means, circuit means for connecting one of said rapid response filters in circuit with said information transmitting means and said tachometer generator and for connecting the other of said rapid response filters in circuit with one of said rapid response signal converters, said signals provided by said tachometer generator and rapid response converter being out of phase with respect to the instantaneous characteristic represented by said signals, said filters each having a predetermined time delay compensating for differences in the time delays of said converters and said tachometer generator whereby simultaneous signals supplied to said information transmitting means represent instantaneous characteristics of the motor, said information transmitting apparatus thereby providing as the motor is started and operated comparative data of at least two instantaneous characteristics of the motor.

References Cited in the file of this patent

UNITED STATES PATENTS

| | | |
|---|---|---|
| 1,960,614 | Anderson | May 29, 1934 |
| 2,348,922 | Pekar | May 16, 1944 |
| 2,517,805 | Spindler | Aug. 8, 1950 |
| 2,626,307 | Suhr et al. | Jan. 20, 1953 |
| 2,637,204 | Short | May 5, 1953 |
| 2,674,125 | Eagan | Apr. 6, 1954 |
| 2,700,134 | Stewart et al. | Jan. 18, 1955 |